United States Patent
Nootens et al.

(10) Patent No.: US 6,545,078 B1
(45) Date of Patent: Apr. 8, 2003

(54) FLAME RESISTANT POLYVINYLARENE POLYMER COMPOSITIONS

(75) Inventors: Claude Nootens, Brye (BE); Govind Rauniyar, Grand-Leez (BE); Dominique Paul Theo Joseph Vliers, Leuven (BE)

(73) Assignee: Nova Chemicals (International) S.A., Fribourg (CH)

( * ) Notice: Subject to any disclaimer, the term of this patent is extended or adjusted under 35 U.S.C. 154(b) by 41 days.

(21) Appl. No.: 09/913,689

(22) PCT Filed: Aug. 2, 2000

(86) PCT No.: PCT/EP00/01009

§ 371 (c)(1),
(2), (4) Date: Mar. 1, 2002

(87) PCT Pub. No.: WO00/50500

PCT Pub. Date: Aug. 31, 2000

(30) Foreign Application Priority Data

Feb. 24, 1999 (EP) .............................................. 99400458

(51) Int. Cl.[7] ................................................. C08L 3/34

(52) U.S. Cl. ........................ 524/442; 524/430; 524/500; 524/524

(58) Field of Search ................................ 524/442, 430, 524/500, 524

(56) References Cited

U.S. PATENT DOCUMENTS

| | | | | |
|---|---|---|---|---|
| 4,191,670 A | * | 3/1980 | Strauch et al. | 260/23 AR |
| 4,425,440 A | * | 1/1984 | Bloembergen et al. | 521/54 |
| 6,114,423 A | * | 9/2000 | Eck et al. | 524/265 |

* cited by examiner

Primary Examiner—David W. Wu
Assistant Examiner—Rip A. Lee
(74) Attorney, Agent, or Firm—Suzanne Kikel

(57) ABSTRACT

Composition containing polyvinylarene polymer particles, which particles are bound to each other by a binder composition based on a silicate and an organic polymer having a weight average molecular weight of at least 500,000 g/mol, as measured in accordance with gel permeation chromatography. The invention furthermore relates to a process for the preparation of such compositions, to the binder composition per se and to a kit of parts.

8 Claims, No Drawings

FLAME RESISTANT POLYVINYLARENE POLYMER COMPOSITIONS

The present invention relates to polyvinylarene polymer compositions having good flame resistant properties and adequate friability behaviour, to a process for their preparation and to a kit of parts.

Polyvinylarene polymers, such as polystyrene, are used in many applications. Some of these applications require good flame resistance. Examples are insulating and building materials.

From e.g. BE 8 901 199 it is known that coating of partly expanded polystyrene polymer particles with a silicate containing liquid can result in sandwich panels having improved flame resistance. However, Applicant has found that the articles formed from such coated polystyrene particles are friable, i.e. disintegrate easily at low levels of strain.

It is an object of the present invention to provide polyvinylarene polymer compositions having a good flame resistance, combined with an adequate degree of non-friability.

It has surprisingly been found that the object of the invention can be attained by preparing a composition containing polyvinylarene polymer particles, which are bound to each other by a mixture of a silicate and an organic polymer having a relatively high molecular weight. Such compositions have a good flame resistance, as well as an improved friability behaviour compared to polyvinylarene polymer particles merely coated with a silicate-containing liquid.

Accordingly, the present invention relates to a composition containing polyvinylarene polymer particles, which particles are bound to each other by a binder composition based on a silicate and an organic polymer having a weight average molecular weight of at least 500,000 g/mol, as measured in accordance with gel permeation chromatography.

Furthermore, the present invention also relates to the binder composition per se.

The polyvinylarene polymer particles for use in the present invention are typically based on vinylarene monomers like styrene, α-methylstyrene, p-methylstyrene, dimethylstyrene, divinylbenzene and styrenic derivates such as ring-halogenated styrenes. Preferably, they are based on styrene, optionally mixed with at most 50% wt of any other monomer, based on the polyvinylarene polymer particles. Most preferably, the polyvinylarene polymer particle is polystyrene.

Polyvinylarene polymer particles are conveniently prepared by solution, suspension, emulsion or bulk polymerisation processes. Such processes have been extensively described in the art. The polymerisation reaction itself may be initiated thermally, via free radical polymerisation or via anionic polymerisation. Advantageously, the polyvinylarene polymer particles are prepared in a suspension polymerisation process in which vinylarene is polymerised in aqueous suspension in the presence of from 0.1 to 1% by weight of a free radical initiator. For the suspension polymerisation many methods and initiators are known. In this respect reference is made to, e.g., U.S. Pat. Nos. 2,656,334 and 3,817,965, and European patent application No. 488,040. The initiators mentioned therein are also applicable in the preparation of the particles of the present invention. In particular suitable are organic peroxy compounds, such as peroxides, peroxy carbonates and peresters. Typical examples of these peroxy compounds are $C_{6-20}$ acyl peroxides, such as decanoyl peroxide, benzoyl peroxide, octanoyl peroxide, stearyl peroxide, peresters, such as t-butyl perbenzoate, t-butyl peracetate, t-butyl perisobutyrate, tertiair-butyl (2 ethylhexyl) monoperoxycarbonate, hydroperoxides and dihydrocarbyl peroxides, such as those containing $C_{3-10}$ hydrocarbyl moieties, including di-isopropyl benzene hydroperoxide, di-t-butyl peroxide, dicumyl peroxide or combinations thereof. Other initiators different from peroxy compounds are also possible, e.g., α,α'-azobisisobutyronitrile.

The suspension polymerisation is suitably carried out in the presence of suspension stabilisers. Suitable suspension stabilisers are well known in the art and comprise poly (vinyl-alcohol), gelatine, agar, polyvinyl pyrrolidine, polyacrylamide, inorganic stabilisers such as alumina, bentonite, magnesium silicate or phosphates, like tricalciumphosphate and/or disodiumhydrogen phosphate, optionally in combination with any of the stabilising compounds mentioned earlier. The amount of stabiliser may suitably vary from 0.1 to 0.9% wt, based on the weight of the aqueous phase.

The suspension polymerisation is suitably carried out at two temperature stages, in which the temperature in the first stage is from 85 to 110° C. and in the second stage is from 115 to 140° C.

In order to render polyvinylarene polymer particles expandable, a blowing agent may be added before, during or after the polymerisation. Examples of suitable blowing agents are $C_2$–$C_6$ hydrocarbons or halogenated hydrocarbons, water, inorganic blowing agents, such as carbon dioxide or, nitrogen or air. Further examples are so-called chemical blowing agents, i.e. compounds that release gaseous components upon heating. The latter compounds are usually solid and are particularly used in bulk polymerisation techniques. Examples are e.g. carbon dioxide or nitrogen-liberating solid compounds. The amount of blowing agent to be used depends very much on the kind of blowing agent applied. For hydrocarbon blowing agents, typical amounts are 1–8% by weight, based on the weight of the polymer particle.

It will be appreciated that the polyvinylarene polymer particles may contain additional additives, such as flame-retarding compounds, dyes, fillers, lubricants, stabilisers, regulators for foam porosity, nucleating agents such as waxes, like polyethylene wax or paraffin wax, which are well-known in the art.

The silicate for use in the present invention is suitably selected from alkali metal silicates, such as sodium silicate, potassium silicate, lithium silicate, or may be selected from quartenary ammonium silicates. The use of sodium silicate is preferred. The weight of the silicate with respect to the weight of the polyvinylarene polymer particles in the compositions of the present invention preferably varies from 2:1 up to 1:2. Most preferably, this ratio is around 1:1.

It is preferred to apply the silicate to the polyvinylarene polymer particles in the form of a silicate-containing liquid. The use of "water glass" is preferred. Water glass is a substance well known in the art and represents an aqueous solution of a water soluble alkali metal silicate, preferably sodium silicate. Taking e.g. sodium silicate, the silicate in water glass is commonly assigned the chemical formula $Na_2O.(x)SiO_2$ wherein x can vary widely, but is usually in the range of from 0.5 to 5.0 and more commonly in the range of from 1.0 to 4.0. The amount of alkali metal silicate in the water glass solution to be used may vary. Preferably, water glass solutions having a viscosity below 500 Centipoise (at 23° C.) are used, more preferably below 300 Centipoise, most preferably below 200 Centipoise.

The organic polymer to be applied in the binder of the compositions of the present invention must have a weight average molecular weight of at least 500,000 g/mol. This molecular weight is determined by analysing the polymer samples at 25° C. by gel permeation chromatography, using tetrahydrofuran as mobile phase and polystyrene calibration. Subsequently, the molecular weight of the organic polymer is calculated from the polystyrene mass using the Mark Houwink equation. The values K=0.000141 dL/g and a=0.7 should be used for polystyrene and K=0.000350 dL/g and a=0.63 for the organic polymer. The Mark-Houwink equation (also called Mark-Houwink-Sakurada equation) is well known in the art and can be found in e.g. "J. Brandrup en E. H. Immergut, Polymer handbook, third edition", page VII/1 and further. Preferably, the weight average molecular weight is at least 650,000 g/mol, most preferably at least 700,000 g/mol. In this patent document, an "organic polymer having a weight average molecular weight of at least 500,000 g/mol" and a "high molecular weight organic polymer" are being used equivalent.

The high molecular weight organic polymer can any be suitable polymer. Examples are homopolymers or copolymers based on e.g. vinylalkanoates, such as vinylacetate, vinylproprionate; olefinically unsaturated monomers such as ethene, propene, butene, butadiene, isoprene, styrene-butadiene monomer, vinylchloride and fluoroethene; acrylates, including alkyl substituted acrylates such a methyl methacrylate, 2-ethylhexylacrylate; acrylic acids including alkyl substituted acrylic acids such as methacrylic acid, ethylacrylic acid, propylacrylic acid, butylacrylic acid; acrylamide, methacrylamide, sodium vinylsulphonate, and mixtures thereof. In this context, the term "copolymers" is not restricted to polymer based on only two different monomer components. Preferably, the high molecular weight organic polymer contains at least 10 mol % vinylacetate, more preferably at least 50 mol %, optionally in combination with any of the monomers mentioned above.

Surprisingly, it has been found that particularly good results are obtained when the high molecular weight organic polymer is based on vinylacetate and a vinyl ester of one or more carboxylic acids in which the acid moiety contains 5 to 16, preferably 8 to 12, more preferably 9 to 11 carbon atoms. Preferably, the carboxylic acid used is a saturated, monocarboxylic acid. More preferably, the carboxylic acid used is a saturated, monocarboxylic acid in which the carbon$_{13}$ atom of the carboxylgroup is attached to a tertiary carbon atom having a methyl group as one of its side groups. Vinyl esters of the latter type of carboxylic acids are available under the trade mark "VeoVa" (ex Shell). The weight ratio of vinylacetate to vinyl ester may be from 10:90 to 85:15, preferably from 60:40 to 80:20. In addition, the high molecular weight organic polymer may contain other co-monomers as mentioned in the previous paragraph, in particular acrylate monomers, including the alkyl substituted acrylate monomers, or acrylic acids, including the alkyl substituted acrylic acids. The acrylate monomers are preferably present in an amount of up to 30% by weight, based on the weight of the monomers, such as between 0.5 and 10% by weight. The acrylic acid monomers are preferably present an amount of up to 5% by weight, such as between 0.5 and 1% by weight. Most preferably, the acrylate and acrylic acid monomers are not present at all. A copolymer of vinylacetate with a vinyl ester of a saturated monocarboxylic acid in which the acid moiety contains 10 carbon atoms and in which the carbon atom of the carboxylgroup is attached to a tertiary carbon atom having a methyl group as one of its side groups ("Veova 10") gave particularly good results.

Suitably, the high molecular weight organic polymer is applied to the polyvinylarene polymer particles in the form of a latex, wherein the amount of high molecular weight organic polymer is from 45 to 55% by weight, based on the weight of the latex. A latex is understood to be an emulsion containing polymer particles having an average particle size of 100 to 800 nm, more typically from 200–500 nm. If a latex of a copolymer of vinylacetate and a vinyl ester of one or more carboxylic acids in which the acid moiety contains 5 to 16 carbon atoms is used, the amount of high molecular weight organic polymer preferably is 50% by weight, based on the weight of the latex. It will be appreciated that the latex may further contain additives like antifungal additives, latex stabilisers, etc.

The weight of the high molecular weight organic polymer in the composition may vary between wide ranges. However, it has surprisingly been found that relatively small amounts of high molecular weight organic polymer already allow for a good flame resistance and a substantial improvement of friability behaviour. This is advantageous in view of e.g. economic reasons. Preferably the weight ratio of high molecular weight organic polymer versus polyvinylarene polymer varies of from 1:5 to 1:20, more preferably from 1:8 to 1:15. Most preferably, this ratio is from 1:10 to 1:12.

Apart from the composition per se, the present invention also relates to a process for the preparation of a composition according to the present invention, by mixing polyvinylarene polymer particles with a silicate and an organic polymer having a weight average molecular weight of at least 500,000 g/mol as measured by gel permeation chromatography.

In a first embodiment, the unexpanded polyvinylarene polymer particles are mixed with a silicate-containing liquid and a high molecular weight organic polymer latex and is subsequently pre-expanded. Pre-expansion is understood to be expansion of unexpanded polyvinyalarene polymer particles upon exposure to heat, yielding particles with a reduced density, e.g. 50 g/l or less. This method has the disadvantage that the particles may stick to each other before being pre-expanded.

In a preferred embodiment, unexpanded polyvinylarene polymer particles are mixed with the high molecular weight organic polymer latex and are subsequently pre-expanded. The pre-expanded beads thus obtained are mixed with the silicate-containing liquid.

In a most preferred embodiment, the polyvinylarene polymer particles are first pre-expanded to lower densities and subsequently mixed with the silicate-containing liquid and high molecular weight organic polymer latex. Most suitably, the silicate-containing liquid and high molecular weight organic polymer latex are mixed with each other prior to being applied to the pre-expanded polyvinylarene polymer particles.

The compositions obtained from any of these embodiments can be further processed by e.g. being dried on air or being moulded using conventional moulding techniques like steam. For the sake of clarity it is mentioned that the compositions according to the present invention relate to the compositions obtained before and after being dried in any way.

Finally, the present invention relates to a kit of parts that can be used to prepare the compositions according to the present invention. Accordingly, the present invention relates to a kit of parts containing
  (a) polyvinylarene polymer particles
  (b) a silicate-containing liquid
  (c) a latex of an organic polymer having a weight average molecular weight of at least 500,000 g/mol, as measured in accordance with gel permeation chromatography.

The invention will now be illustrated by the following examples.

EXAMPLE 1

Polystyrene polymer particles were prepared by conventional suspension polymerisation. The particles were pre-expanded using steam to an apparent density of 19 g/l.

475 gram of a sodium silicate solution as defined below and 25 gram of a latex as defined below were mixed together and were subsequently mixed with 130 gram of the pre-expanded polystyrene particles.

The mixture thus obtained was poured in a mould, shaken for 20 minutes, allowed to dry on air and cut into specimens of 200*150*30 mm. These were exposed to a propane flame of 38 mm height for respectively 20 or 120 seconds. The ignition source was applied to the specimen which was placed either in a vertical or in a horizontal position in a fume-hood. The foam damage observed in the specimen were recorded. The results are shown in Table 1.

COMPARATIVE EXPERIMENT B

Example 1 was repeated with the exception that no latex and no sodium silicate solution were added. The pre-expanded polystyrene particles were moulded using a steam pressure of 0.9 kPa G. The foam obtained was cut into specimens and subjected to the flame test as described in Example 1.

The friability of the foam obtained from Example 1 and comparative experiment A were measured in accordance with ASTM C421-71. In summary, the test method comprises placing 12 foam specimens (25*25*25 mm) in a cubical box of oak together with 24 cubes of oak (19 mm each side). The box is then rotated at 60 rpm for 10 minutes. After removing the dust, the foam specimens are weighed. The percentage loss in weight is calculated. The results are shown in Table 2.

TABLE 1

| | Foam density | Exposure | Sample in vertical position exposed to the flame; extent of damage, mm | | | Sample in horizontal position exposed to the flame; extent of damage | | |
|---|---|---|---|---|---|---|---|---|
| | kg/m³ | time | length | width | depth | length | width | depth |
| Example 1 | 45.7 | 20 s | 110 | 25 | 5 | 25 | 12 | ND |
| | | 120 s | ND | ND | ND | 20 | 15 | 3 |
| Example 2 | 47.3 | 20 s | 110 | 35 | 15 | 25 | 12 | ND |
| | | 120 s | ND | ND | ND | 25 | 20 | 4 |
| Comp. Exp. A | 44.7 | 20 s | 100 | 35 | 2 | 25 | 25 | 5 |
| | | 120 s | 110 | 36 | 5 | 40 | 45 | 12 |
| Comp. Exp. B. | 19.5 | 20 s | 130 | 55 | 25 | 40 | 35 | 15 |
| | | 120 s | 170 | 60 | 25 | ND | ND | ND |

ND = not determined

Sodium silicate solution:

$Na_2O.xSiO_2$; x = 1
viscosity: 143 cPt (23° C.)
% sodium silicate: 25–30% wt, based on weight of the solution latex polymer; copolymer of 1400 pbw vinylacetate and 600 pbw "VeoVa 10" vinylester
weight average molecular weight of the polymer: 706,000 g/mol
(the weight average molecular weight was determined in accordance with the method set out in the description)
% polymer: 50% by weight, based on weight of the latex
average particle size: 390 nm

EXAMPLE 2

Example 1 was repeated with the exception that 450 gram of the sodium silicate solution and 50 gram latex were used.

The results are shown in Table 1.

COMPARATIVE EXPERIMENT A

Example 1 was repeated with the exception that no latex was added and that 500 gram of the sodium silicate solution was used.

The results are shown in Table 1.

TABLE 2

| | Friability test (% weight loss)* |
|---|---|
| Comp. Exp. A | 60 |
| Example 1 | 15 |

*ASTM C421-71

Table 1 and Table 2 show that the addition of latex and sodium silicate to polystyrene particles renders the formed article less friable compared to the sole addition of sodium silicate, without significantly impairing the foam fire behaviour.

What is claimed is:

1. Composition containing polyvinylarene polymer particles, which particles are bound to each other by a binder composition based on a silicate and an organic polymer having a weight average molecular weight of at least 500,000 g/mol, as measured in accordance with gel permeation chromatography, and wherein the weight ratio of said orgenic polymer versus said polyvinylarene polymer particles varies from 1:5 to 1:20.

2. Composition as claimed in claim 1, wherein the organic polymer having a weight molecular weight of at least 500,000, is based on vinylacetate and a vinyl ester of one or more carboxylic acids in which the acid moiety contains 5 to 16 carbon atoms.

3. Composition as claimed in claim 2, wherein the vinylester is the vinyl ester of a saturated, monocarboxylic acid in which the carbon atom of the carboxylgroup is attached to a tertiary carbon atom having a methyl group as one of its side groups.

4. Composition on as claimed in claim 3, wherein the silicate has the chemical formula $Na_2O \cdot (x)SiO_2$, wherein x is in the range of from 0.5 to 5.0.

5. Process for the preparation of a composition as defined in claim 4, wherein polyvinylarene polymer particles are mixed with a silicate and an organic polymer having a weight average molecular weight of at least 500,000 g/mol, as measured by gel permeation chromatography.

6. Process according to claim 5, wherein the polyvinylarene polymer particles are pre-expanded to lower densities and subsequently mixed with a silicate-containing liquid and a high molecular weight organic polymer latex.

7. Process according to claim 6, wherein the silicate-containing liquid and high molecular weight organic polymer latex are mixed with each other prior to being applied to the pre-expanded polyvinylarene polymer particles.

8. Kit of parts containing (a) polyvinylarene polymer particles;

(b) a silicate-containing liquid;

(c) a latex of an organic polymer having a weight average molecular weight of at least 500,000 g/mol, as measured in accordance with gel permeation chromatography, and wherein the weight ratio of said organic polymer versus said polyvinylarene polymer particles varies from 1:5 to 1:20.

\* \* \* \* \*